(12) United States Patent
Jin et al.

(10) Patent No.: US 10,244,435 B2
(45) Date of Patent: Mar. 26, 2019

(54) CABLE CELLULAR HETEROGENEOUS NETWORK

(71) Applicant: CISCO TECHNOLOGY, INC., San Jose, CA (US)

(72) Inventors: Hang Jin, Plano, TX (US); John T. Chapman, Coto de Caza, CA (US)

(73) Assignee: Cisco Technology, Inc., San Jose, CA (US)

( * ) Notice: Subject to any disclaimer, the term of this patent is extended or adjusted under 35 U.S.C. 154(b) by 65 days.

(21) Appl. No.: 15/647,109

(22) Filed: Jul. 11, 2017

(65) Prior Publication Data

US 2018/0184337 A1 Jun. 28, 2018

Related U.S. Application Data

(60) Provisional application No. 62/438,130, filed on Dec. 22, 2016.

(51) Int. Cl.
*H04W 36/00* (2009.01)
*H04W 36/04* (2009.01)
*H04B 3/23* (2006.01)
*H04L 12/28* (2006.01)

(52) U.S. Cl.
CPC .......... *H04W 36/0016* (2013.01); *H04B 3/23* (2013.01); *H04L 12/2863* (2013.01); *H04W 36/04* (2013.01)

(58) Field of Classification Search
CPC .. H04B 3/23; H04L 12/2863; H04W 36/0016; H04W 36/04
See application file for complete search history.

(56) References Cited

U.S. PATENT DOCUMENTS

2007/0140195 A1* 6/2007 Kaftan ................ H04L 29/1233
370/338
2011/0170496 A1* 7/2011 Fong ..................... H04L 5/0053
370/329
2013/0250971 A1* 9/2013 Mora ..................... G06F 13/00
370/467

(Continued)

FOREIGN PATENT DOCUMENTS

WO 2017156481 A1 9/2017

OTHER PUBLICATIONS

European Extended Search Report dated Dec. 1, 2017 cited in Application No. 17183151.4, 9 pgs.

*Primary Examiner* — Benjamin H Elliott, IV
(74) *Attorney, Agent, or Firm* — Merchant & Gould P.C.

(57) ABSTRACT

A method is described and in one embodiment includes providing a physical connection between a node and a user equipment at a subscriber premises via a cable connection, wherein the node comprises a Data Over Cable Service Interface Specification ("DOCSIS") remote PHY device ("RPD") collocated with a cellular small cell device; receiving at the node a cellular downlink ("DL") data signal from a cellular network connected to the cellular small cell device; combining the received cellular DL data signal with a DOCSIS downstream ("DS") signal from a cellular network connected to the DOCSIS RPD to create a combined DS data signal; and forwarding the combined DS data signal from the node to the user equipment via the cable connection.

20 Claims, 8 Drawing Sheets

(56) References Cited

U.S. PATENT DOCUMENTS

| | | | |
|---|---|---|---|
| 2014/0307627 A1* | 10/2014 | Shatzkamer | H04L 69/22 |
| | | | 370/328 |
| 2015/0052257 A1* | 2/2015 | Mora | G06F 13/00 |
| | | | 709/227 |
| 2015/0334467 A1* | 11/2015 | Chapman | H04L 12/2801 |
| | | | 725/111 |
| 2017/0086088 A1* | 3/2017 | Wang | H04L 41/00 |
| 2017/0181122 A1* | 6/2017 | Kim | H04W 68/02 |
| 2017/0244577 A1* | 8/2017 | Patrick | H04L 12/2801 |
| 2017/0265106 A1* | 9/2017 | Andreoli-Fang | |
| | | | H04W 28/0268 |
| 2017/0353750 A1* | 12/2017 | Gotwals | H04N 21/2408 |
| 2018/0019854 A1* | 1/2018 | Andreoli-Fang | H04L 1/1887 |
| 2018/0184337 A1* | 6/2018 | Jin | H04L 12/2863 |

* cited by examiner

| CARRIER | UHF VOICE FREQUENCIES | | | 3G UHF FREQUENCY / BAND NAME | | | | 4G UHF FREQUENCY / BAND NUMBER | | | | | | | |
|---|---|---|---|---|---|---|---|---|---|---|---|---|---|---|---|
| | 800 MHz | 850 MHz | 1700 MHz 2100 MHz | 1900 MHz | 850 MHz CLR | 1700 MHz 2100 MHz AWS | 1900 MHz PCS | 700 MHz 12, 17 | 750 MHz 13 | 800 MHz 26 | 850 MHz 5 | 1700 MHz 2100 MHz 4 | 1900 MHz 2.25 | 2500 MHz 41 |
| AT&T MOBILITY | x | ✓ | | ✓ | ✓ | x | ✓ | ✓ | x | x | ✓ | ✓ | ✓ | x |
| T-MOBILE US | x | x | ✓ | ✓ | x | ✓ | ✓ | ♂* | x | ✓ | x | ✓ | ♂* | x |
| SPRINT CORPORATION | ✓ | x | x | x | x | x | ✓ | x | ✓ | ✓ | x | x | ✓ | ✓ |
| VERIZON WIRELESS | x | ✓ | x | ✓ | ✓ | x | ✓ | ✓ | x | x | x | ✓ | x | x |
| U.S. CELLULAR | ✓ | x | x | ✓ | ✓ | x | ✓ | ✓ | x | x | ✓ | x | x | x |

*PROMISED/IN CONSTRUCTION.
† 2010 - CURRENT.
§ 2012 - CURRENT.

FIG. 6

| | CABLE CELLULAR HetNet | REMOTE RADIO HEAD (FRONT HAUL) |
|---|---|---|
| COST | NEED ONLY A LOW COST CELLULAR RF TUNER (AS A REFERENCE, CURRENT DOCSIS CM TURNER COSTS ~$2, MAXLINEAR) | HIGH COST, NEED ADC/DAC, MODULATOR/DEMODULATOR |
| REQUIRED BANDWIDTH | 20MHz SPECTRUM IN THE MIDDLE OF DOCSIS DS | TRAFFICS FROM EACH RADIO HEAD (CM) OCCUPIES 20MHz (20MHz SPECTRUM, 12 BITS DIGITIZATION, 4KQAM), 100 CMs CONSUME 2Gbps BI-DIRECTIONAL |
| INVASIVE | MINIMUM/ NO CHANGE TO SMALL CELL HARDWARE, THE REQUIRED EC IN FRONT OF SMALL CELL RECEIVER IS TRANSPARENT TO SMALL CELL OPERATION | NEED TO RE-STRUCTURE SMALL CELL HARDWARE, NEW SMALL RECEIVER ARCHITECTURE (NEW CHANNELIZATION) |

FIG. 7

CABLE CELLULAR HETEROGENEOUS NETWORK

CLAIM OF PRIORITY

This application claims the benefit of priority under 35 U.S.C. § 119(e) to U.S. Provisional Application Ser. No. 62/438,130, entitled "CABLE CELLULAR HETEROGENEOUS NETWORK," filed Dec. 22, 2016. The disclosure of this prior application is considered part of (and are incorporated by reference in) the disclosure of this application.

TECHNICAL FIELD

This disclosure relates in general to the field of communications networks and, more particularly, to a cable cellular heterogeneous network ("HetNet").

BACKGROUND

A "HetNet" typically denotes use of multiple types of access nodes in a wireless network. For example, a wide area network ("WAN") may employ macrocells, picocells, and femtocells to offer wireless coverage in a wide variety of coverage zones, ranging from outdoors to inside buildings to underground areas. A HetNet provides complex interoperation among macrocell, small cell, and WiFi network elements to provide a wide network of coverage, with handoff capability between the network elements. A HetNet is multi-technology, multi-domain, multi-spectrum, multi operator, and multi-vendor.

Architecturally, a HetNet may be viewed as including conventional macro radio access network ("RAN") functions, RAN transport capability, small cells, and Wi-Fi functionality, all of which are increasingly being virtualized and delivered in a networking environment in which the extent of control includes data center resources associated with compute, networking, and storage.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 6 is a chart illustrating United States carrier frequency use;

FIG. 7 is a chart illustrating a comparison between a cable cellular HetNet implemented in accordance with embodiments described herein and cable cellular fronthaul;

DETAILED DESCRIPTION OF EXAMPLE EMBODIMENTS

Overview

Figure 1:
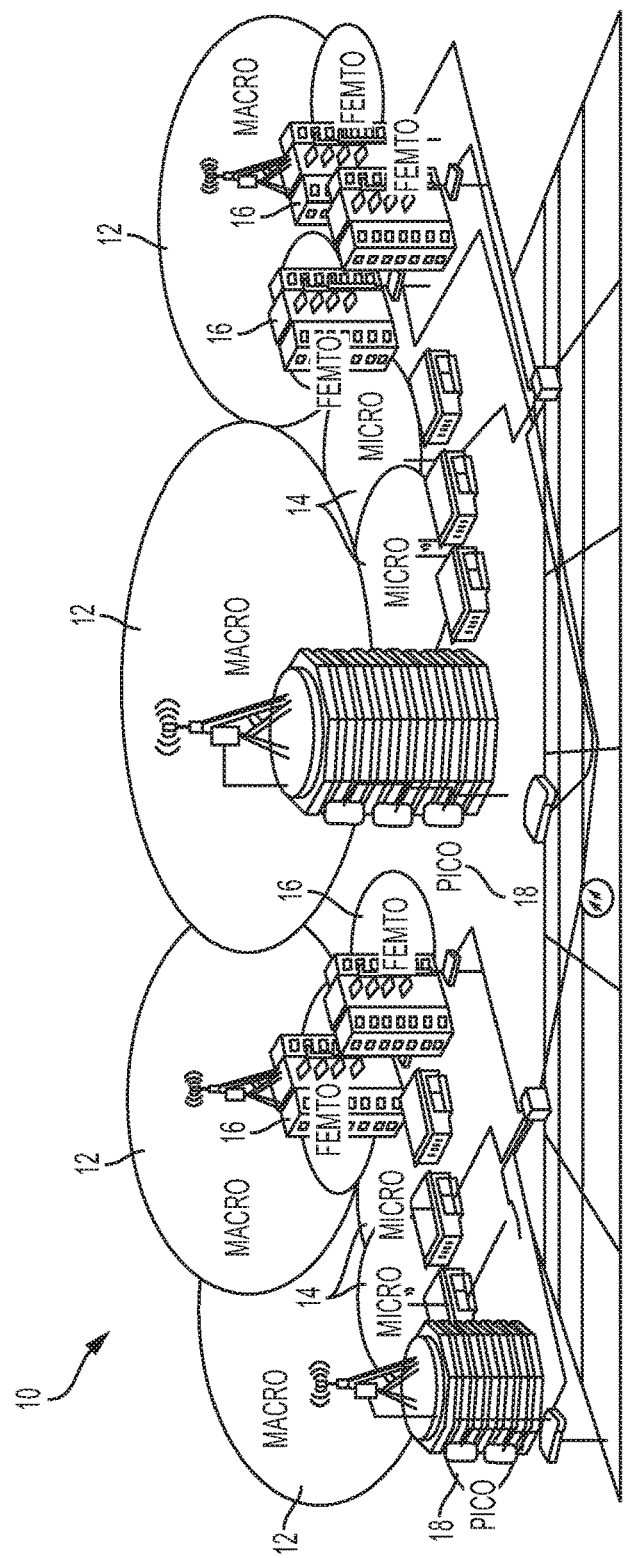
FIG. 1 is a simplified high-level block diagram illustrating a cellular HetNet that may be deployed in accordance with features of embodiments described herein.

A method is described and in one embodiment includes providing a physical connection between a node and a user equipment at a subscriber premises via a cable connection, wherein the node comprises a Data Over Cable Service Interface Specification ("DOCSIS") remote PHY device ("RPD") collocated with a cellular small cell device; receiving at the node a cellular downlink ("DL") data signal from a cellular network connected to the cellular small cell device; combining the received cellular DL data signal with a DOCSIS downstream ("DS") signal from a cellular network connected to the DOCSIS RPD to create a combined DS data signal; and forwarding the combined DS data signal from the node to the user equipment via the cable connection.

Example Embodiments

Numerous challenges are currently facing mobile network operators ("MNOs"), including high cell site costs, poor indoor coverage, and multi-cell interference. Additionally, most capital expenditures ("CAPEX") and operating expenses ("OPEX") are cell site related (construction, rental, maintenance, etc.). In response, proposed herein is a technique for including cable network technology as part of cellular HetNet architecture for last mile wireless access. In certain embodiments, a Data Over Cable Service Interface Specification ("DOCSIS") remote PHY device ("RPD") and a mobile small cell (or a small cell PHY) are combined into a single device, thereby embedding mobile technology into cable technology.

One of the key requirements for cellular service is ubiquitous coverage. Indoor coverage is always the biggest challenge to MNO. Distributing cellular signals through coax provides good indoor coverage, which complements MNO outdoor coverage by macro/micro cells. A multiple system operator ("MSO") could operate as a mobile virtual network operator ("MVNO"), which allows it to access the cellular macro/micro cells (and other existing cellular infrastructure). Enhanced with their own indoor network, the MSO/MVNO could provide much better coverage and user experiences. Indoor coverage can be provided with relatively low cost by MSO versus MNO, as there is little to no site construction and rental costs to MSO, which is the biggest cost in cellular networks.

Mobile broadband traffic has surpassed voice traffic and is continuing to grow rapidly. This trend is set to continue with no end in sight. Such traffic growth, which is primarily driven by introduction of new services and terminal capabilities, is paralleled by user expectations for data rates similar to those of fixed broadband. Several considerations impact effective HetNet design. From a demand perspective, traffic volumes and locations and target data rates are significant to consider. From a supply perspective, important considerations include radio environment, macro-cellular coverage, site availability, backhaul transmission, spectrum, and integration with the existing macro network. Commercial aspects, including technology competition, business models, and marketing/pricing strategies, must also be considered.

With regard to wireless network deployments, many network operators, are entering the mobile space using, for example, a Mobile Virtual Network Operator ("MVNO"), or Mobile Other Licensed Operator ("MOLO"), model as an initial step. Network operators include but are not limited to Multiple-System Operators ("MSOs"), Telecommunications Companies ("telcos"), satellite operators (including high speed satellite broadband services), fiber operators, and UAV internet providers. An MVNO is a wireless communications services provider that does not own all or a portion of the wireless network infrastructure over which the operator provides services to its customers. An MVNO may enter into a business arrangement with a Mobile Network Operator ("MNO") to obtain bulk access to network services at wholesale rates and then sets retail prices independently. An MVNO may use its own customer service, billing, marketing, and sales personnel or could use the services of a Mobile Virtual Network Enabler ("MVNE"). With the existing Hybrid Fiber Coaxial ("HFC") infrastructure, network operators, such as MSOs, are in a position to readily deploy mobile small cells, as well as backhaul/fronthaul/midhaul (hereinafter collectively referred to as "haul" or "hauling") their own network traffic. MSOs can leverage small cells to achieve better MVNO economics. Furthermore, network operators utilizing an MVNO/MONO model are positioned to backhaul MNO network traffic between small cell/remote radio head connected wireless devices supported by an MNO and the MNO's mobile core.

As used herein, the term "small cell" refers to a range of low-powered radio access nodes, including microcells, picocells, and femtocells, that operate in both licensed and unlicensed spectrum with a smaller range than that of a "macrocell." It will be recognized that, while techniques disclosed herein are primarily described with reference to small cells, the techniques may be broadly applicable to other types and sizes of radios, including, for example, macrocells, microcells, picocells, and femtocells. Additionally, in accordance with features of embodiments described herein, a small cell may be implemented as a standalone small cell, or simply a small cell ("SC") or eNodeB ("eNB"), in which its functionality is contained within a single component, or it may be implemented as a split small cell in which its functionality is split into separate components including a central small cell ("cSC") and a remote small cell ("rSC").

It is recognized that small cell technology will pay a significant role in future 5G networks. Some 5G applications (e.g., mission critical MTC, VR, tactile Internet) require 1-10 ms end-to-end deterministic latency. This includes time allocated for device processing, air interface round trip time ("RTT"), and network processing. The backhaul latency must also fit within this end-to-end latency budget. 3GPP "New Radio" focuses on a new air interface design to achieve the latency budget; however, today's backhaul incurs latency an order of magnitude more. Networks with lower backhaul latency will be able to provide superior 5G experience and serve niche 5G applications. Other applications include Wi-Fi, 3G, 4G, LTE, etc.

FIG. 1 illustrates a high-level diagram of a cellular HetNet 10 that may be deployed in connection with embodiments described herein. As shown in FIG. 1, the cellular HetNet 10 comprises a plurality of macrocells 12, microcells 14, femtocells 16, and picocells 18, for example, interconnected via a variety of access technologies for providing network access to user equipment ("UE"). As previously noted, HetNets are comprised of a combination of different cell types and different access technologies. HetNet was a result of continuous evolution of wireless access network to address user requirements (capacity and coverage).

Figure 2:
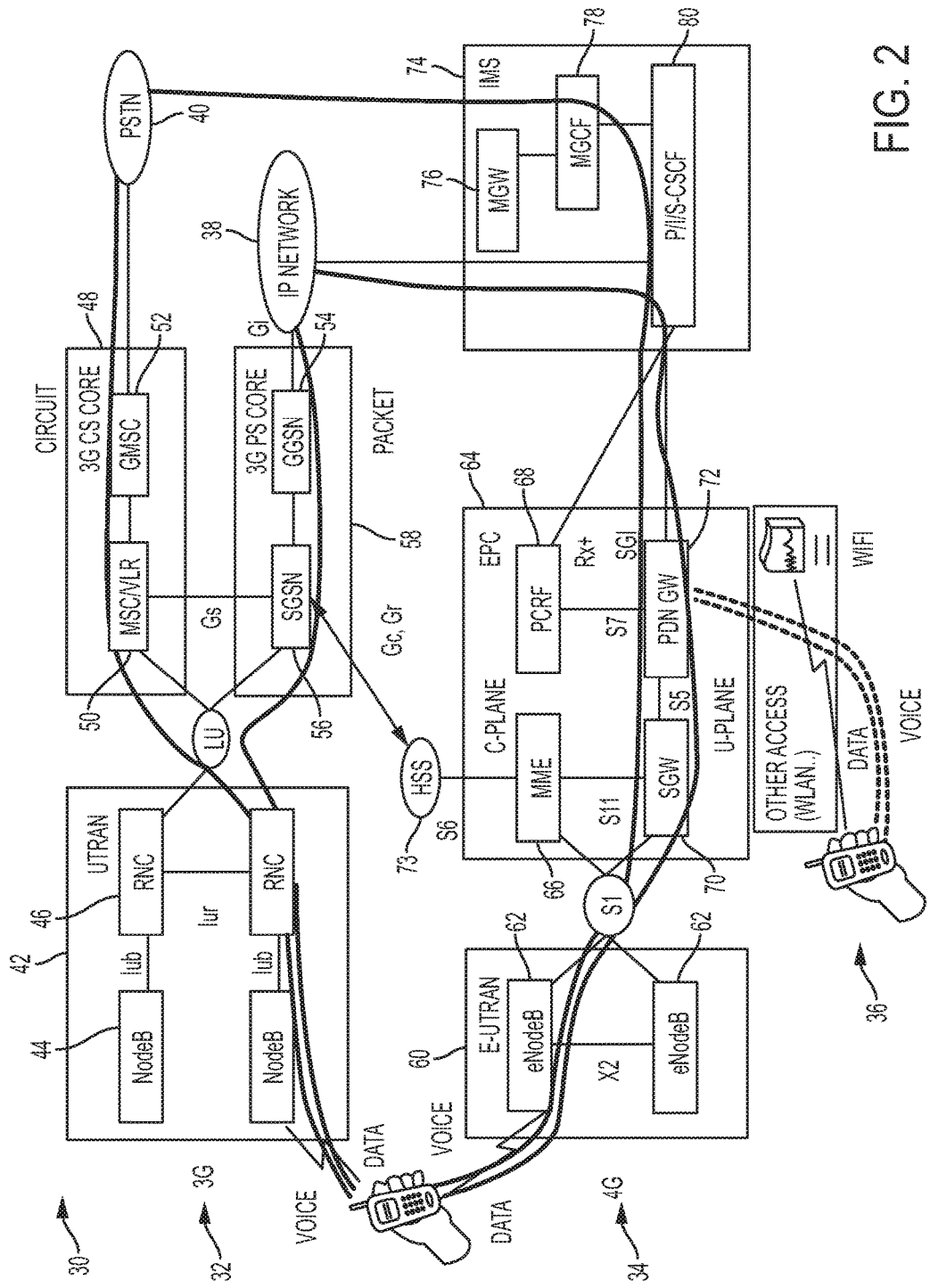
FIG. 2 is a more detailed high-level block diagram illustrating a cellular HetNet that may be deployed in accordance with features of embodiments described herein.

FIG. 2 illustrates a more detailed block diagram of a cellular HetNet 30 that may be deployed in connection with embodiments described herein. As shown in FIG. 2, the cellular HetNet 30 includes a 3G access network 32, a 4G LTE access network 34, and a WiFi access network 36 for accessing an IP network 38 and a public switched telephone network ("PSTN") 40, for example.

In the illustrated embodiment, the 3G access network 32 includes a Universal Terrestrial Radio Access Network ("UTRAN") 42 comprising a plurality of NodeBs 44 each controlled by one of a plurality of interconnected radio control nodes ("RNCs") 46. The UTRAN 42 is connected to a 3G circuit switching ("CS") core 48 that includes a mobile switching center ("MSC")/visitor location register ("VLR") 50 and a gateway MSC ("GMSC") 52 and a 3G packet switching ("PS") core 54 that includes a serving GPRS support node ("SGSN") 56 and a gateway GPRS support node ("GGSN") 58.

The 4G access network 34 includes an E-UTRN 60 comprising a plurality of eNodeBs 62. The E-UTRAN 60 is connected to an Evolved Packet Core ("EPC") 64 that includes a mobile management entity ("MME") 66, a policy and charging rules function ("PCRF") 68, a serving gateway ("SGW") 70, a PDN gateway ("PGW") 72, and a home subscriber server ("HSS") 73, which may provide a connection to the SGSN 56. The EPC 64 is connected to IP network 38 and PSTN 40 via an IP multimedia system ("IMS") 74 that includes a mobile gateway ("MGW") 76, a media gateway charging function ("MGCF") 78, and a proxy/interrogating/serving call session control function ("P/I/S-CSCF") 80.

As will be described in greater detail hereinbelow, cable networks are well suited to provide backhaul for small cell and other types of networks, including, for example, fiber networks, other optical networks, and satellite networks. Cable networks and the wireless access portions are currently independent links; there exists no joint optimization to maximize efficiencies on the wired or wireless links. While it will be understood that embodiments described herein may be applied to a number of fronthaul and backhaul networks, for sake of clarity and improve understanding the remainder of this disclosure will be directed to cable networks, MSO, and DOCSIS and backhaul applications. This is not meant to be limiting in any way.

Data over Cable Service Interface Specification ("DOCSIS") is an international telecommunications standard that enables implementation of high-speed data transfer over an existing cable TV ("CATV") network. DOCSIS may be employed by cable operators, also referred to as Multiple System Operators ("MSOs"), to provide Internet access over their existing hybrid fiber-coaxial ("HFC") infrastructure and may provide a variety of options available at Open Systems Interconnection ("OSI") layers 1 and 2, i.e., the physical layer and data link layer.

DOCSIS has enabled cable operators to widely deploy high-speed data services on CATV systems. Such data services allow subscriber-side devices, such as personal computers and the like, to communicate over an ordinary CATV network. A Cable Modem Termination System ("CMTS") connects the CATV network to a data network, such as the Internet. DOCSIS specifies that cable modems obtain upstream bandwidth according to a request/grant scheme. A cable modem sends a bandwidth allocation request to the CMTS when subscriber devices need to send traffic upstream into the cable network. The CMTS grants these requests using bandwidth allocation MAP messages. As with any system that serves consumers, optimizing speed, latency, processing time, synchronization, etc., presents a significant challenge to system designers, network architects, and engineers alike.

An HFC network will typically include a headend connected to a plurality of distribution hubs via a transport ring. Television channels are frequency division multiplexed onto a beam of light that travels through optical fiber trunk lines that fan out from the distribution hubs to a plurality of optical nodes disposed in local communities, for example. In certain embodiments, each of the optical nodes 20 can serve 500-2000 homes; however, that range is representative only and not intended to be limiting. At each of the optical nodes, the received light signal is translated into a RF electrical signal, which is distributed through coaxial cable to individual subscriber households. Trunk RF amplifiers and line RF amplifiers may be disposed along the coaxial cable to ensure that the amplitude of the RF signal remains sufficient throughout the system.

In a more traditional backhaul architecture, small cells are expected to be deployed within or outside of a macro cell coverage area for boosting capacity, enhancing coverage, etc. Traditionally, backhaul is enabled via a mobile operator's fiber infrastructure. There are two major issues with extending this traditional backhaul architecture for small cells. First, costs can become high when fiber is needed to be run for each small cell. The traditional peer-to-peer architecture between the mobile core and each macro cell works well for the traditional sparse macro cell deployment model. Second, there is lack of support for the X2 interface. The lack of low latency logical links between small cells results in inefficient and non-optimal network transport. In contrast, in accordance with features of embodiments described herein, DOCSIS 3.1 CMTS is deployed to support a limited number of commercial grade, integrated DOSIS small cells. Existing HFC infrastructure is reused; accordingly, there is no new cost associated with running new fiber to small cell sites. Additionally, depending on the peering point for LTE traffic, local breakout for traffic that does not need to traverse back to the mobile core can be supported by the CMTS. The CMTS can implement an intelligent scheduler to dynamically load balance the small cells based on a variety of factors.

It will be recognized that one of the key requirements for cellular service is ubiquitous coverage, with indoor coverage consistently providing the biggest challenge to an MNO. Distributing cellular signal through coaxial cable (e.g., via a DOCSIS cable network) provides good indoor coverage, which complements MNO outdoor coverage by macro/micro cells. In certain embodiments, an MSO could operate as an MVNO, enabling access to cellular network macro/micro cells (and other existing cellular infrastructure). Enhanced with their own indoor network, an MSO/MVNO could provide much better coverage and superior user experience.

Figure 3:
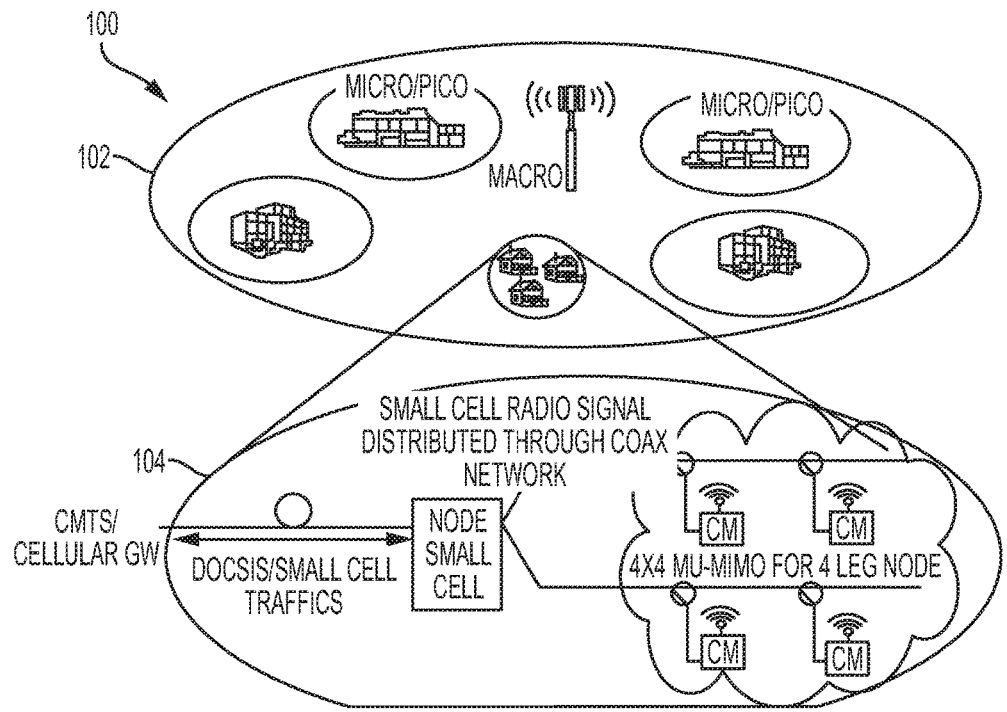
FIG. 3 is a simplified high-level block diagram of a cable cellular HetNet in accordance with features of embodiments described herein.

Indoor coverage may be provided relatively more inexpensively by an MSO than by an MNO, as an MSO has little to no site construction and rental costs, which are the biggest costs in cellular network provision. It will be noted that upwards of 80% of wireless traffic originate from indoor locations; accordingly, great indoor coverage and capacity directly translates into improved user experiences. In certain embodiments, services provided via a cable cellular HetNet (e.g., indoor coverage) can be sold back to an MNO to offset MVNO Capital Expenditure ("CAPEX") and Operating Expenditure ("OPEX"). FIG. 3 illustrates a simplified block diagram of a cable cellular HetNet 100 in accordance with features of an embodiment described herein.

Figure 4:
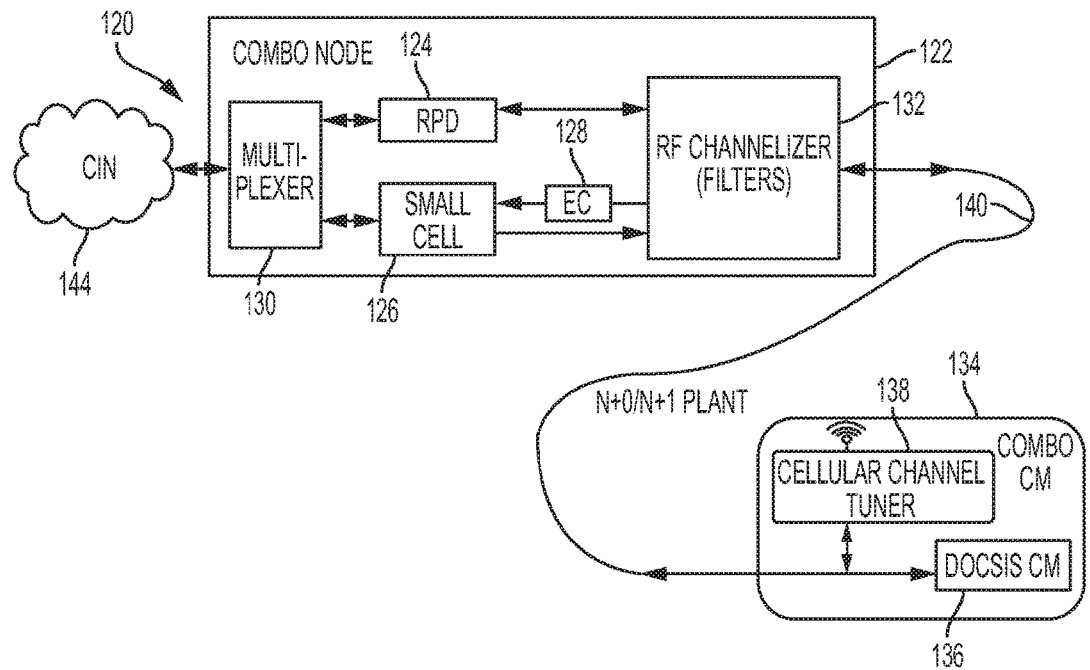
FIG. 4 is a simplified block diagram of a DOCSIS network for use in implementing a cable cellular HetNet in accordance with features of embodiments described herein.

As shown in FIG. 3, small cell radio signals from a cellular network 102 may be distributed via a coax (i.e., cable) network 104. Elements of cable cellular HetNet shown in FIG. 3 will be described in greater detail below. FIG. 4 is a more detailed block diagram of a DOCSIS, or cable, network 120 for use in implementing a cable cellular HetNet in accordance with an embodiment described herein.

As shown in FIG. 4, a combo node 122 comprises a cable remote PHY device ("RPD") 124, a small cell (or a small cell PHY) 126, an echo cancellation module ("EC") 128, a multiplexer 130, and an RF channelizer (filters) 132. The RF channelizer (filters) 132 is an add-on module, and transparent to RPD 124 and small cell 126 operation. Echo cancellation provided by echo cancellation module 128 is required in the small cell receiver path as its uplink ("UL") sits in the middle of DOCSIS downstream ("DS") spectrum. A combo cable modem ("CM") 134 includes a DOCSIS CM 136 and a channel tuner 138. The channel tuner 138 may be an add-on module or integrated into the silicon comprising the CM 134. The combo node 122 is connected to the combo CM via an N+0/N+1 plant 140. As will be described in greater detail below, the combo node 122 receives signals from a cellular integrated network ("CIN") 142.

Figure 5A:
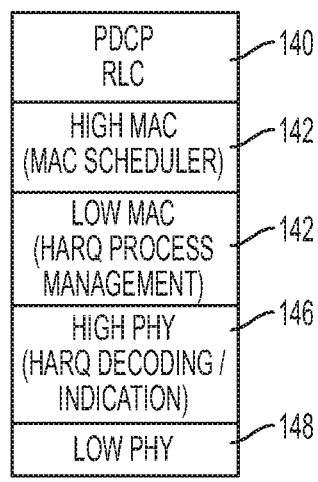
FIG. 5A is a simplified block diagam illustrating LTE functional decomposition in accordance with embodiments described herein.
Figure 5B:
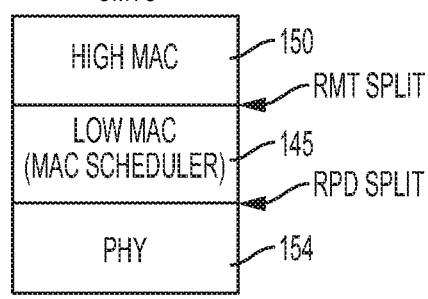
FIG. 5B is a simplified block diagram illustrating CMTS functional decomposition in accordance with embodiments described herein.

FIG. 5A is a simplified block diagram illustrating LTE functional radio protocol stack in accordance with embodiments described herein. As shown in FIG. 5A, LTE functionality includes a Packet Data Convergence Protocol ("PDCP")/Radio Link Control ("RLC") layer 140, a high Medium Access Control ("MAC") layer 142, which includes MAC scheduling functionality, a low MAC layer 144, which includes Hybrid Automatic Repeat reQuest ("HARQ") process management functionality, a high physical ("PHY") layer 146, which includes HARQ decoding and indication functionality, and a low PHY layer 148. FIG. 58 is a simplified block diagram illustrating CMTS functional decomposition in accordance with embodiments described herein. As shown in FIG. 5B, CMTS functionality includes a high MAC layer 150, a low MAC layer 152, which includes MAC scheduling functionality, and a PHY layer 154. As also shown in FIG. 5B, a remote MAC/PHY device ("RMD") split is defined as a split between the high MAC layer 150 and the low MAC layer 152 and a remote PHY device ("RPD") split is defined as a split between the low MAC layer 152 and the PHY layer 154.

Referring again to FIG. 4, the network 120 supports connection of at least one user equipment device ("UE") (not shown), via a radio frequency ("RF") interface to a cellular node in the CIN 142. As used herein, UE can be associated with clients, customers, or end users wishing to initiate a communication in a communication system via some network. The term "user equipment" is inclusive of devices used to initiate a communication, such as a computer, a personal digital assistant (PDA), a laptop or electronic notebook, a cellular telephone, an iPhone, an IP phone, or any other device, component, element, or object capable of initiating voice, audio, video, media, or data exchanges within a communication system. UE may also be inclusive of a suitable interface to the human user, such as a microphone, a display, or a keyboard or other terminal equipment. UE may also be any device that seeks to initiate a communication on behalf of another entity or element, such as a program, a database, or any other component, device, element, or object capable of initiating an exchange within a communication system. Data, as used herein in this document, refers to any type of numeric, voice, video, media, or script data, or any type of source or object code, or any other suitable information in any appropriate format that may be communicated from one point to another. On power up, UE can be configured to initiate a request for a connection with a service provider. A user agreement can be authenticated by the service provider based on various service provider credentials (e.g., subscriber identity module ("SIM"), Universal SIM ("USIM"), certifications, etc.). More specifically, a device can be authenticated by the service provider using some predetermined financial relationship.

Referring again to FIG. 4, the combo node 122 is connected to the combo CM 134 via an N+0/N+1 plant 140. It will be recognized that "N+m" is used to describe cable plant topology. N stands for "node" and m is the number of amplifiers between the node and the CM. Accordingly, "N+0" means there are no amplifiers between the node and the CM; "N+1" means that there is one amplifier between the node and the CM. In certain embodiments, the combo CM 134 may be connected to one or multiple combo nodes, such as the combo node 122. As will be illustrated and described in greater detail below, the combo CM 134 is connected to a cable modem termination system ("CMTS") via hybrid fiber coax ("HFC"), for example, which connects the combo node 122/combo CM 134 to the wireless core, which may be implemented as an LTE packet core. It will be recognized that wireless core may also comprise a WiFi core, a 5G core, or any other wireless network core. It will be understood RPD 124 may be collocated with the small cell 126 or may be located separate and independent from the small cell 126.

In certain embodiments, the CM includes the RF portion of a cellular tuner and an antenna. In the DS direction, the tuner extracts the cellular downlink ("DL") signal from the DOSIS DS signal and directs it to the antenna. In the DOCSIS upstream ("US") direction, the cellular UL signal is picked up by the antenna, cleaned by the tuner, and then added into the DOCSIS US signal. The combo node includes a collocated small cell and a special tuner to extract the cellular UL signal from the DOCSIS DS spectrum and feed it to the small cell receiver via the echo cancellation module. The cellular DL signal is added into the DOSIS DS signal.

Antennas may be implemented as passive antennas (with or without filters) or active antennas (which provide amplification, drawing power from the cable plant to do so), as a single high-power antenna or multiple lower power antennas, and inside and/or outside a building.

As shown in FIG. 3, 4×4 multiple user-multiple input multiple output ("MU-MIMO") is used to support a 4-legged node with a single small cell radio. Referring again to FIG. 4, the multiplexer multiplexes small cell backhaul traffic with DOCSIS traffic (cellular signal is outside DOCSIS tunnels).

FIG. 6 illustrates United States carrier frequency use. All of the listed spectrum falls within coaxial cable operable band, making a strong use case for cable extended frequency ranges enabled by embodiments described herein.

Support for multiple operators/carriers depends on the MVNO model. For example, MSO may stick with one MNO, in which case a cable cellular HetNet will need to support a single operator. In contrast, if an MSO works with multiple MNOs, a cable cellular HetNet will need to carry multiple carriers. To support multiple carriers, multiple small cells or one small cell supporting multiple carriers, RF channelizer at the combo node to support multiple carriers, and a channel tuner at the CMP to support multiple carriers may be required.

With regard to quality of service ("QoS"), a cable cellular HetNet integrates indoor network seamlessly with cellular infrastructure, guaranteeing end-to-end traffic QoS, while an indoor femto/small cell routes traffic outside of cellular infrastructure, in which case QoS is not guaranteed. WiFi provides poor QoS, as the over-the-air interface was not designed to support real time applications.

With regard to data accessibility, using a cable cellular HetNet, user data is accessible, potentially leading to new services, whereas with an indoor femto/small cell, traffic is routed outside of the cellular network. With WiFi, traffic is routed outside of the cellular network.

With regard to network planning (frequency re-use and multi-cell interference mitigation), using a cable cellular HetNet as part of the overall cellular HetNet, frequency planning and interference mitigation can be coordinated holistically and multiple vendors/carriers could be supported. In contrast, using an indoor femto/small cell, there is less control and the cell may be moved to a different area, possibly causing interference with an outdoor macro/micro cell. In addition, an indoor femto/small cell is not part of the cellular HetNet, necessitating multiple boxes to support multiple vendors/carriers.

Cable Cellular HetNet may be considered as a novel and low cost distributed antenna system ("DAS") specifically geared for an MSO by leveraging the MSO's existing infrastructure. In particular, a cable cellular HetNet leverages existing passive coax network ("PCN") and syncs up with RPD deployment with little or no extra deployment costs. In contrast, traditional DAS requires an expensive cable layout, works only for large enterprise buildings and is not feasible for residential deployments, and its cost is related to the deployment of small cells.

FIG. 7 illustrates a comparison between a cable cellular HetNet as described herein and cable cellular fronthaul. Cable cellular fronthaul means multiple remote radio heads (located at CMs) and connected to a centric controller through digital links. Cable cellular fronthaul is very challenging with the coax plant.

Cable cellular HetNet allows an MSO to re-position coax network as a part of cellular HetNet and provide indoor coverage at a fractional cost. Cable cellular HetNet aligns with an MSO's long-term vision of MVNO and gives an MSO incentive to continue to invest in coax network. Cable cellular HetNet will help pull in RPD, and vice versa. A full duplex amplifier becomes relevant if N+1 plant needs be supported (Cellular UL signal in middle of DOCSIS DS). Cellular cable cellular HetNet provides a use case for small cell and DOCSIS convergence (CMTS+LTE GW, local offload/onload).

Figure 8:
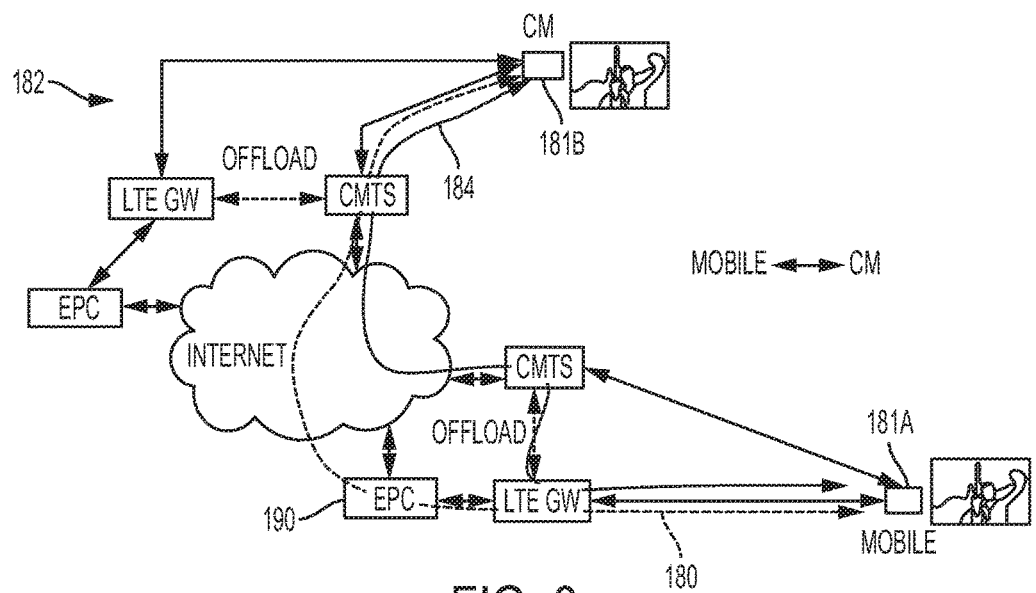
FIG. 8 is a simplified block diagram of a cable cellular HetNet implemented in accordance with embodiments described herein herein illustrating a cellular-to-cable local offload/onload use case example.
Figure 9:
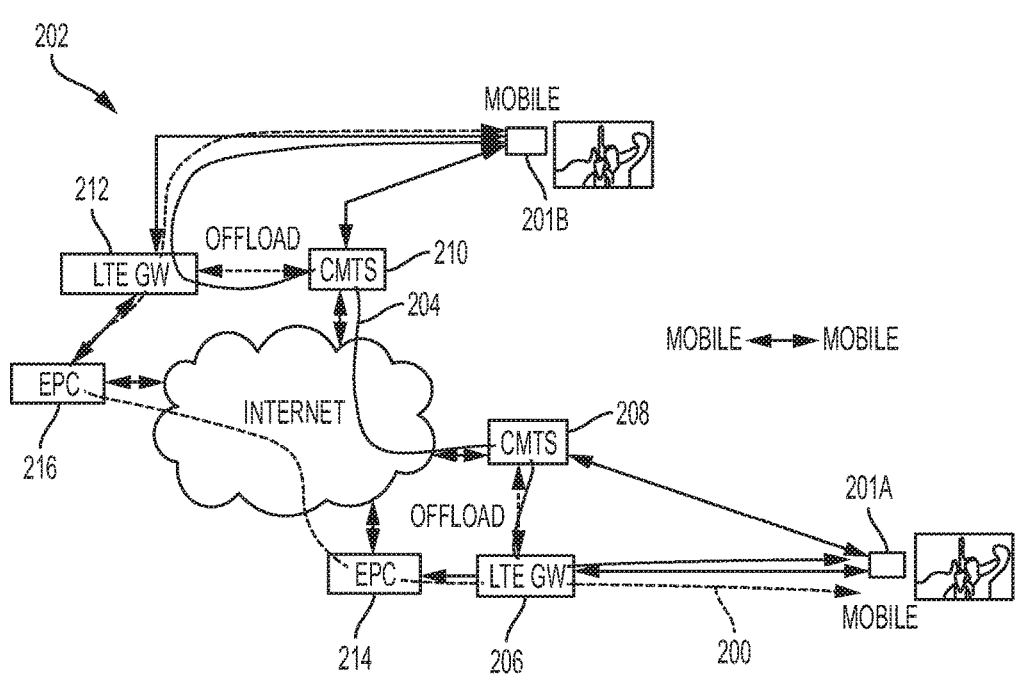
FIG. 9 is a simplified block diagram of a cable cellular HetNet implemented in accordance with embodiments described herein herein illustrating a cellular-to-cellular local offload/onload use case example.

In certain embodiments, convergence on access (cable cellular HetNet) allows local offload/onload at CMTS/LTE GW. Local offload/onload reduces network traffics on LTE evolved packet core ("EPC"), leverages MSO network capacity, may reduce MVNO OPEX (EPC usage), and may improve user experience. In particular, with local offload/ onload, traffic arriving LTE GW (SB interface) will be classified for potential offload based on destination (terminating devices are non-mobiles, for example, CM), network congestion, and SLA, for example. Traffic arriving at CMTS (NB interface) will be classified for potential onload, based on destination (terminating devices are mobiles), for example. FIG. 8 illustrates a mobile-CM local offload/ onload example. FIG. 9 illustrates a mobile-mobile local offload/onload example.

Referring to FIG. 8, a path 180 represents an original data path of LTE traffic between a mobile device 181A and a CM 181B through a cable cellular HetNet 182 without implementation of offload/onload techniques described hereinbelow, whereas a path 184 represents a data path of LTE traffic in accordance with features of embodiments described herein in which LTE data traffic from mobile device 181A and CM 181B is offloaded from an LTE GW 186 to a CMTS 188, thereby bypassing an EPC 190. As illustrated by path 180, without use of the offload/onload techniques, traffic travels through the EPC 190. Similarly, data traffic from CM 1818 to mobile device 181A is offloaded from CMTS 188 to LTE GW 186, again bypassing EPC 190.

Referring to FIG. 9, a path 200 represents an original data path of LTE traffic between a mobile device 201A and a mobile device 201B through a cable cellular HetNet 202 without implementation of offload/onload techniques, whereas a path 204 represents a data path of LTE traffic in accordance with features of embodiments described herein in which LTE data traffic from mobile device 201A to 201B is offloaded from an LTE GW 206 to a CMTS 208 and from a CMTS 210 to an LTE GW 212, thereby bypassing EPCs 214, 216. Similarly, LTE data traffic from mobile device 201B to 201A is offloaded from the LTE GW 212 to CMTS 210 and from CMTS 208 to LTE GW 206, again bypassing EPCs 214, 216.

Figure 10:
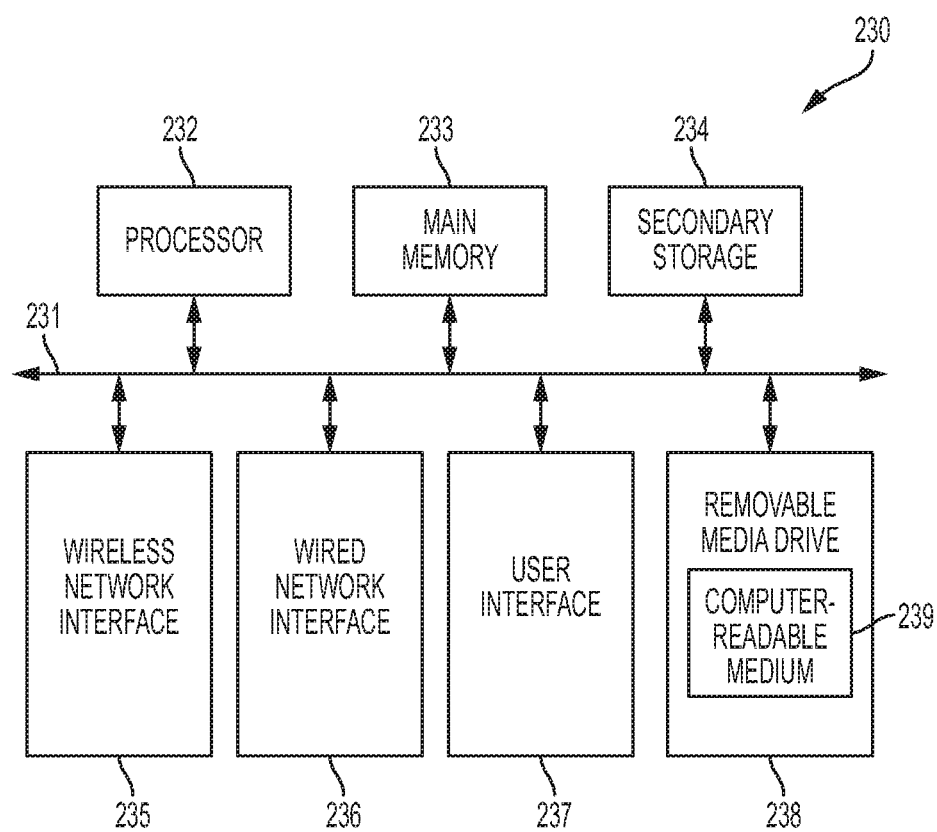
FIG. 10 is a simplified block diagram of a machine comprising an element of a communications network in which embodiments described herein for a cable cellular HetNet may be implemented.

Turning to FIG. 10, FIG. 10 illustrates a simplified block diagram of an example machine (or apparatus) 230, which in certain embodiments may be a classifier or a forwarding element, that may be implemented in embodiments described herein. The example machine 230 corresponds to network elements and computing devices that may be deployed in a communications network, such as a classifier or a forwarding element. In particular, FIG. 10 illustrates a block diagram representation of an example form of a machine within which software and hardware cause machine 230 to perform any one or more of the activities or operations discussed herein. As shown in FIG. 10, machine 230 may include a processor 232, a main memory 233, secondary storage 234, a wireless network interface 235, a wired network interface 236, a user interface 237, and a removable media drive 238 including a computer-readable medium 239. A bus 231, such as a system bus and a memory bus, may provide electronic communication between processor 232 and the memory, drives, interfaces, and other components of machine 230.

Processor 232, which may also be referred to as a central processing unit ("CPU"), can include any general or special-purpose processor capable of executing machine readable instructions and performing operations on data as instructed by the machine-readable instructions. Main memory 233 may be directly accessible to processor 232 for accessing machine instructions and may be in the form of random access memory ("RAM") or any type of dynamic storage (e.g., dynamic random access memory ("DRAM")). Secondary storage 234 can be any non-volatile memory such as a hard disk, which is capable of storing electronic data including executable software files. Externally stored electronic data may be provided to computer 230 through one or more removable media drives 238, which may be configured to receive any type of external media such as compact discs ("CDs"), digital video discs ("DVDs"), flash drives, external hard drives, etc.

Wireless and wired network interfaces 235 and 236 can be provided to enable electronic communication between machine 230 and other machines, or nodes. In one example, wireless network interface 235 could include a wireless network controller ("WNIC") with suitable transmitting and receiving components, such as transceivers, for wirelessly communicating within a network. Wired network interface 236 can enable machine 230 to physically connect to a network by a wire line such as an Ethernet cable. Both wireless and wired network interfaces 235 and 236 may be configured to facilitate communications using suitable communication protocols such as, for example, Internet Protocol Suite ("TCP/IP"). Machine 230 is shown with both wireless and wired network interfaces 235 and 236 for illustrative purposes only. While one or more wireless and hardwire interfaces may be provided in machine 230, or externally connected to machine 230, only one connection option is needed to enable connection of machine 230 to a network.

A user interface 237 may be provided in some machines to allow a user to interact with the machine 230. User interface 237 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 238 represents a drive configured to receive any type of external computer-readable media (e.g., computer-readable medium 239). Instructions embodying the activities or functions described herein may be stored on one or more external computer-readable media. Additionally, such instructions may also, or alternatively, reside at least partially within a memory element (e.g., in main memory 233 or cache memory of processor 232) of machine 230 during execution, or within a non-volatile memory element (e.g., secondary storage 234) of machine 230. Accordingly, other memory elements of machine 230 also constitute computer-readable media. Thus, "computer-readable medium" is meant to include any medium that is capable of storing instructions for execution by machine 230 that cause the machine to perform any one or more of the activities disclosed herein.

Not shown in FIG. 10 is additional hardware that may be suitably coupled to processor 232 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 230 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 230 to appropriately manage the operation of the hardware components therein.

The elements, shown and/or described with reference to machine 230, are intended for illustrative purposes and are not meant to imply architectural limitations of machines such as those utilized in accordance with the present disclosure. In addition, each machine may include more or fewer components where appropriate and based on particular needs. As used in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In particular embodiments, the various components may comprise a software application executing on a specialized hardware appliance (e.g., suitably configured server) with appropriate ports, processors, memory elements, interfaces, and other electrical and electronic components that facilitate the functions described herein. In some embodiments, the various components may execute on separate hardware devices and/or comprise software applications or combination thereof that perform the operations described herein.

Note that although the operations and systems are described herein with respect to a cable network architecture, the operations and systems may be used with any appropriate related network function, including load-balancers, firewalls, WAN accelerators, etc., and the appliances that are associated therewith (e.g., customer premises equipment (CPE), cable modem (CM), etc.)

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/ perfectly efficient state.

In example implementations, at least some portions of the activities outlined herein may be implemented in software in appropriate modules stored in memory devices and executed by one or more processors. In some embodiments, one or more of these features may be implemented in hardware, provided external to these elements, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, such software modules described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors could transform an element or an article (e.g., data, or electrical signals) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term "memory element." Similarly, any of the potential processing elements, modules, and machines described in this Specification should be construed as being encompassed within the broad term "processor."

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication systems described herein may be applicable to other exchanges or routing protocols. Moreover, although communication systems have been illustrated with reference to particular elements and operations that facilitate the communication process, these elements, and operations may be replaced by any suitable architecture or process that achieves the intended functionality of the various communication systems herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
providing a physical connection between a node and a user equipment at a subscriber premises via a cable connection, wherein the node comprises a Data Over Cable Service Interface Specification ("DOCSIS") remote PHY device ("RPD") collocated with a cellular small cell device;
receiving at the node a cellular downlink ("DL") data signal from a cellular network connected to the cellular small cell device;
combining the received cellular DL data signal with a DOCSIS downstream ("DS") signal from a cellular network connected to the DOCSIS RPD to create a combined DS data signal; and
forwarding the combined DS data signal from the node to the user equipment via the cable connection.

2. The method of claim 1 further comprising:
receiving at the node from the user equipment a combined upstream ("US") data signal comprising a cellular uplink ("UL") data signal and a DOCSIS US signal;
extracting the cellular UL data signal from the combined US data signal; and
forwarding the extracted cellular UL data signal to the cellular network via the cellular small cell device.

3. The method of claim 1, wherein the user equipment comprises a cable modem including a cellular tuner for extracting the cellular DL signal from the combined DS data signal and an antenna for receiving the extracted cellular DL signal from the cellular tuner.

4. The method of claim 1, wherein the node comprises a multiplexer connected to the DOCSIS PHY and the cellular small node and wherein the combining comprises using the multiplexer to multiplex DOCSIS DS signal with the cellular DL data signal.

5. The method of claim 2, wherein the node further comprises a tuner and wherein the extracting comprises:
using the tuner to extract the cellular UL data signal from the combined US data signal; and
forwarding the extracted cellular UL data signal to the cellular small cell device.

6. The method of claim 5, wherein node further comprises an echo cancellation ("EC") module and wherein the forwarding the extracted cellular UL data signal to the cellular small cell device further comprises forwarding the extracted cellular UL data signal to the cellular small cell device via the EC module.

7. One or more non-transitory tangible media that includes code for execution and when executed by a processor is operable to perform operations comprising:
providing a physical connection between a node and a user equipment at a subscriber premises via a cable connection, wherein the node comprises a Data Over Cable Service Interface Specification ("DOCSIS") remote PHY device ("RPD") collocated with a cellular small cell device;
receiving at the node a cellular downlink ("DL") data signal from a cellular network connected to the cellular small cell device;
combining the received cellular DL data signal with a DOCSIS downstream ("DS") signal from a cellular network connected to the DOCSIS RPD to create a combined DS data signal; and
forwarding the combined DS data signal from the node to the user equipment via the cable connection.

8. The media of claim 7, wherein the operations further comprise:
receiving at the node from the user equipment a combined upstream ("US") data signal comprising a cellular uplink ("UL") data signal and a DOCSIS US signal;
extracting the cellular UL data signal from the combined US data signal; and
forwarding the extracted cellular UL data signal to the cellular network via the cellular small cell device.

9. The media of claim 7, wherein the user equipment comprises a cable modem including a cellular tuner for extracting the cellular DL signal from the combined DS data signal and an antenna for receiving the extracted cellular DL signal from the cellular tuner.

10. The media of claim 7, wherein the node comprises a multiplexer connected to the DOCSIS PHY and the cellular small node and wherein the combining comprises using the multiplexer to multiplex DOCSIS DS signal with the cellular DL data signal.

11. The media of claim 7, wherein the node further comprises a tuner and wherein the extracting comprises using the tuner to extract the cellular UL data signal from the combined US data signal and forwarding the extracted cellular UL data signal to the cellular small cell device and wherein node further comprises an echo cancellation ("EC") module and wherein the forwarding the extracted cellular UL data signal to the cellular small cell device further comprises forwarding the extracted cellular UL data signal to the cellular small cell device via the EC module.

12. An apparatus comprising:
a node physically connected to a user equipment at a subscriber premises via a cable connection, wherein the node comprises a Data Over Cable Service Interface Specification ("DOCSIS") remote PHY device ("RPD") collocated with a cellular small cell device and wherein the apparatus is configured for:
receiving at the node a cellular downlink ("DL") data signal from a cellular network connected to the cellular small cell device;

combining the received cellular DL data signal with a DOCSIS downstream ("DS") signal from a cellular network connected to the DOCSIS RPD to create a combined DS data signal; and forwarding the combined DS data signal from the node to the user equipment via the cable connection.

13. The apparatus of claim 12 further configured for:

receiving at the node from the user equipment a combined upstream ("US") data signal comprising a cellular uplink ("UL") data signal and a DOCSIS US signal;

extracting the cellular UL data signal from the combined US data signal; and forwarding the extracted cellular UL data signal to the cellular network via the cellular small cell device.

14. The apparatus of claim 12, wherein the user equipment comprises a cable modem including a cellular tuner for extracting the cellular DL signal from the combined DS data signal and an antenna for receiving the extracted cellular DL signal from the cellular tuner.

15. The apparatus of claim 12, wherein the cable connection comprises a hybrid fiber coaxial ("HFC") connection.

16. The apparatus of claim 12, wherein the node comprises a multiplexer connected to the DOCSIS PHY and the cellular small node and wherein the combining comprises using the multiplexer to multiplex DOCSIS DS signal with the cellular DL data signal.

17. The apparatus of claim 13 further configured for performing echo cancellation in a receiver path of the cellular small cell.

18. The apparatus of claim 12, wherein the node comprises a radio frequency ("RF") channelizer.

19. The apparatus of claim 13, wherein the node further comprises a tuner and wherein the extracting comprises:

using the tuner to extract the cellular UL data signal from the combined US data signal; and forwarding the extracted cellular UL data signal to the cellular small cell device.

20. The apparatus of claim 19, wherein node further comprises an echo cancellation ("EC") module and wherein the forwarding the extracted cellular UL data signal to the cellular small cell device further comprises forwarding the extracted cellular UL data signal to the cellular small cell device via the EC module.

* * * * *